(12) United States Patent
Kanemaru

(10) Patent No.: US 9,696,712 B2
(45) Date of Patent: Jul. 4, 2017

(54) NUMERICAL CONTROL DEVICE HAVING FUNCTION OF SIMULTANEOUSLY EXECUTING PLURALITY OF COMMANDS USING DATA IN TABLE FORMAT

(71) Applicant: FANUC Corporation, Minamitsuru-gun, Yamanashi (JP)

(72) Inventor: Akira Kanemaru, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 413 days.

(21) Appl. No.: 14/546,027

(22) Filed: Nov. 18, 2014

(65) Prior Publication Data

US 2015/0142166 A1   May 21, 2015

(30) Foreign Application Priority Data

Nov. 20, 2013   (JP) .................................. 2013-240038

(51) Int. Cl.
- *G05B 19/402* (2006.01)
- *G05B 19/19* (2006.01)
- *G05B 19/4155* (2006.01)

(52) U.S. Cl.
CPC ........... *G05B 19/402* (2013.01); *G05B 19/19* (2013.01); *G05B 19/4155* (2013.01); *G05B 2219/36244* (2013.01); *G05B 2219/42217* (2013.01)

(58) Field of Classification Search
CPC ...... G05B 19/18; G05B 19/19; G05B 19/402; G05B 19/4155; G05B 2219/36244; G05B 2219/42217
See application file for complete search history.

(56) References Cited

U.S. PATENT DOCUMENTS

| 4,692,856 A | 9/1987 | Komiya |
| 2003/0191553 A1 | 10/2003 | Isohata |
| 2006/0255759 A1* | 11/2006 | Takeuchi ............. G05B 19/404 318/574 |

(Continued)

FOREIGN PATENT DOCUMENTS

| CN | 1848011 A | 10/2006 |
| CN | 102768507 A | 11/2012 |

(Continued)

OTHER PUBLICATIONS

The Notification of the First Office Action issued Sep. 29, 2016 in Chinese Patent Application No. 2014106659737 (6 pages) with an English Translation (8 pages).

(Continued)

*Primary Examiner* — Dennis M Butler
(74) *Attorney, Agent, or Firm* — Drinker Biddle & Reath LLP

(57) ABSTRACT

In a numerical control device, a command read out unit sequentially reads out time or a position of an axis or a spindle which is a reference and a position of a different axis or spindle from the axis or the spindle which is the reference or an auxiliary function that are stored in a storage unit. A selection unit selects a processing unit that processes a command which is read out by the command read out unit on the basis of a definition set by a definition unit. The definition unit defines commands executed by each processing unit.

15 Claims, 9 Drawing Sheets

(56) References Cited

U.S. PATENT DOCUMENTS

| | | |
|---|---|---|
| 2010/0004760 A1 | 1/2010 | Endo et al. |
| 2011/0093666 A1 | 4/2011 | Endo et al. |
| 2012/0283879 A1 | 11/2012 | Takeuchi et al. |
| 2013/0060373 A1* | 3/2013 | Otsuki ................ G05B 19/404 700/114 |

FOREIGN PATENT DOCUMENTS

| | | |
|---|---|---|
| JP | S59-177604 A | 10/1984 |
| JP | 2003-303005 A | 10/2003 |
| JP | 2004-110359 A | 4/2004 |
| JP | 2010-15359 A | 1/2010 |
| JP | 2011-90399 A | 5/2011 |

OTHER PUBLICATIONS

Decision to Grant a Patent dated Apr. 28, 2015, along with its English-language translation, in corresponding Japanese Patent Application 2013-240038.

* cited by examiner

FIG.1

DATA IN TABLE FORMAT <S1> OF SPINDLE S

| REFERENCE VALUE | COMMAND |
|---|---|
| ⋮ | ⋮ |
| L2200 | S2500 |
| L6500 | G96 |
| L8000 | T0101 |
| ⋮ | ⋮ |

FIG.3

DATA IN TABLE FORMAT <S2> OF SPINDLE S

| REFERENCE VALUE | COMMAND |
|---|---|
| ⋮ | ⋮ |
| L2200 | S2500 |
| L6500 | G96 |
| L7000 | T0101 |
| ⋮ | ⋮ |

FIG.6

DATA IN TABLE FORMAT <S3> OF SPINDLE S

| REFERENCE VALUE | COMMAND |
|---|---|
| : | : |
| L2200 | S2500 |
| L6500 | G96 |
| L7000 | T0101 |
| : | : |

FIG.7

DEFINITIONS OF COMMANDS EXECUTED BY PROCESSING UNITS

| PROCESSING UNIT | COMMAND |
|---|---|
| PROCESSING UNIT 10 | SPINDLE ROTATION SPEED COMMAND (ADDRESS S) |
| PROCESSING UNIT 20 | CONTROL MODE CHANGING COMMAND (ADDRESS G) |
| PROCESSING UNIT 30 | SUB-TABLE CALLING COMMAND (ADDRESS T) |
| : | : |

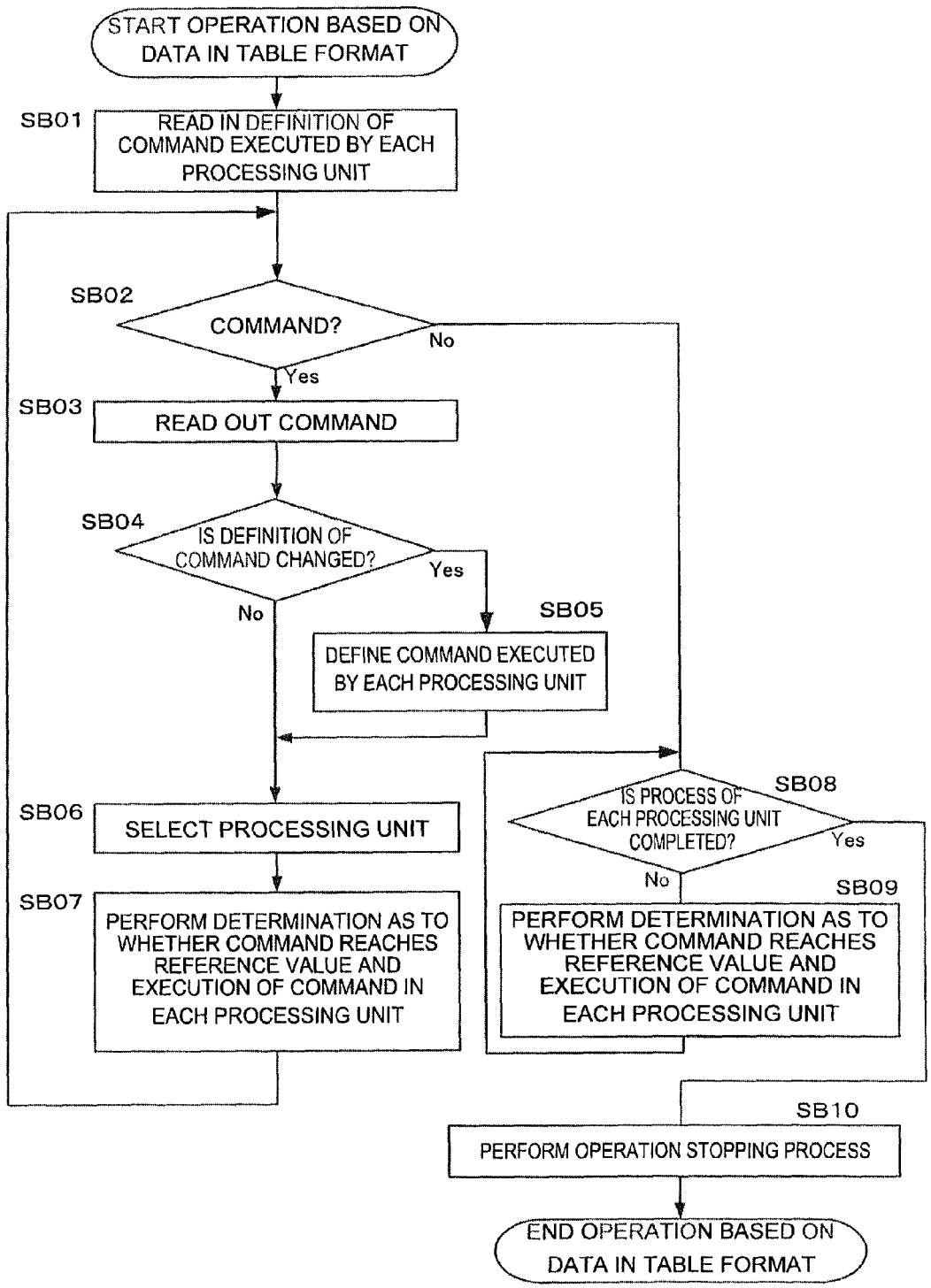

NUMERICAL CONTROL DEVICE HAVING FUNCTION OF SIMULTANEOUSLY EXECUTING PLURALITY OF COMMANDS USING DATA IN TABLE FORMAT

RELATED APPLICATION DATA

This application claims priority under 35 U.S.C. §119 and/or §365 to Japanese Application No. 2013-240038 filed Nov. 20, 2013, the entire contents is incorporated herein by reference.

BACKGROUND OF THE INVENTION

1. Field of the Invention

The present invention relates to a numerical control device controlling a machine tool and specifically relates to a numerical control device having a function of simultaneously executing a plurality of commands using data in table format.

2. Description of the Related Art

Japanese Patent Laid-Open No. 59-177604 and Japanese Patent Laid-Open No. 2003-303005 disclose a numerical control device having a path table operation function for which data in table format (path table) in which positions of axes or auxiliary functions are set with time, a position of an axis or a position of a spindle assumed as a reference is stored in a memory or a storage device connected thereto via a network, for driving the respective axes while sequentially read out the data in table format (path table). A tool can thereby flexibly operate without depending on a machining program, this allowing machining time to be reduced and machining to be performed with higher precision.

However, in operation based on the data in table format, commands which are sequentially read out are executed one by one within each piece of data in table format for controlling the axes, the spindle or the auxiliary functions. Hence, two or more commands in one piece of data in table format cannot be simultaneously executed. After the command that is previously read out reaches a reference value described in the data in table format, is executed, and is completed with its execution, the next command is read out. In the case where the command already exceeds the reference value at which the next command is to be executed and which is described in the data in table format by the execution of the command that is previously read out, an alarm is issued to stop the operation. Therefore, it is necessary to calculate operation time to complete the execution of the command that is previously read out in advance, and to describe the reference value at which the next command is executed in the data in table format. Due to this, to create the data in table format is made complex. Moreover, as to a command the operation time of which is indefinite, the reference value, at which the next command is executed and for which margin time is added to the maximum operation time, is described in the data in table format. This causes the cycle time to be longer.

Changing a control, mode of a spindle S on the basis of the data in table format is exemplarily described. In the conventional operation based on the data in table format, upon a command of changing the control mode of the spindle, a control mode changing command of the spindle is read out after completion of the execution of the previous command, and it is determined whether the command reaches the reference value described in the data in table format. When the command reaches the reference value described in the data in table format, the change of the control mode starts and the read out and the execution of the next command are awaited until the control mode is completed. Therefore, the operation time required for changing the control mode should be secured in advance to describe the reference value at which the next command is executed in the data in table format.

In data in table format <S1> on the spindle S illustrated in FIG. 1, L designates an address indicating the reference value (real time; in msec units) which is described in the data in table format and at which the command is executed, S2500 designates a spindle rotation speed command for setting the rotation speed of the spindle to 2500 (rpm), G96 designates a control mode changing command from a speed control mode to a contour control mode, and T0101 designates a sub-table calling command for calling a sub-table with table number 0101.

Supposing that the time required for changing the control mode is 1000 msec, margin time of 500 msec is added thereto. From the reference value (L6500) at which changing the control mode (G96) is commanded, the time interval of 1500 msec is secured to make the next command (T0101).

FIG. 2 shows a relation between the operation time and the margin time which are required for changing the control mode from the speed control mode to the contour control mode. At L2200, the spindle rotation speed command (S2500) is executed. Determination as to whether the command reaches the reference value is performed, and upon reaching 1.6500, the control mode changing command (G96) is executed to start changing the control mode. During the change of the control mode, the read out of the next command is awaited. Upon reaching L7500, changing the control mode is completed. Then, the sub-table calling command (T0101) is read out. Determination as to whether the command reaches the reference value is performed, and upon reaching L8000, the sub-table calling command (T0101) is executed.

Herein, as illustrated in FIG. 3, if the sub-table calling command for calling the sub-table with table number 0101 is commanded at the reference value L7000, the read out is to be performed at the reference value L7500 at which changing the control mode is completed. However, as illustrated in FIG. 4, since the command already exceeds the reference value which is described in the data in table format and at which the sub-table calling command is executed, it is necessary to stop the operation.

Due to this, in changing the control mode, the operation time required for changing the control mode should be obtained as a measured value or on the basis of an equation, and the margin time for correcting the operation time which fluctuates depending on the execution circumstances should be added thereto to describe the reference value at which the next command is executed in the data in table format. The above-mentioned problem is not limited to changing the control mode but the above-mentioned problem occurs to the execution of a command which requires operation time using the data in table format for controlling the axes, the spindle or the auxiliary functions.

SUMMARY OF THE INVENTION

Some embodiments of the present invention has been made in order to solve the above-mentioned problem of the conventional techniques, and an object of the present invention is to provide a numerical control device including a unit that simultaneously executes two or more commands in one piece of data in table format, the device including a plurality of processing units for determining whether the reference value described in the data in table format is reached and executing the commands.

Some embodiments of the present invention includes a unit that can simultaneously execute two or more commands in one piece of data in table format by performing determination as to whether a command reaches the reference value described in the data in table format and execution of the command for each command sequentially read out from each piece of data in table format as to the axis, the spindle or the auxiliary function controlled using the data in table format.

In the conventional prefetching method of the command, in order to calculate a smooth movement path and optimized acceleration and deceleration, a plurality of command blocks are read out. On the contrary, the present invention is characterized in that the commands which are read out are separately executed and the execution results thereof are independently obtained in the operation based on the data in table format. Consequently, in creating the data in table format, it is not necessary to calculate the operation time for each command, this facilitating the creation of the data in table format. Furthermore, even for a command the operation time of which is indefinite, no addition of the maximum operation time or the margin time to a reference value of the next command is necessary to describe in the data in table format, this allowing the cycle time to be reduced.

There is provided a numerical control device for operation based on data in table format according to the present invention, configured to set time or a position of an axis or a spindle as a reference, store, in a memory or a storage device connected via a network thereto, the data in table format in which the time or the position of the axis or the spindle as the reference is associated with a position of a different axis or spindle from the axis or the spindle as the reference or an auxiliary function, and the device includes a command read out unit configured to sequentially read out the time or the position of the axis or the spindle as the reference and the position of the different axis or spindle from the axis or the spindle as the reference or the auxiliary function, the device is further configured to control the position of the different axis or spindle or the auxiliary function in synchronization with the time or the position of the axis or the spindle as the reference, the device including: a plurality of processing units each of which configured to determine whether a command reaches a reference value described in the data in table format and execute the command; a definition unit configure to define at least one command to be executed by each of the plurality of processing units; and a selection unit configured to select one processing unit configured to process the command which is read out on the basis of the definition unit Each of the plurality of processing units may include a changing unit configured to change the reference value described in the data in table format for executing the read-out command.

The definition unit may categorize a plurality of commands into one or a plurality of groups and define the command executed by each processing unit on the basis of the groups.

The definition unit may include a changing unit configured to change a definition of the command executed by each processing unit at the beginning of the operation or in the operation, based on the data in table format.

Each of the plurality of processing units may include management unit configured to manage an execution state and an execution result of the command in each processing unit.

The selection unit may select one processing unit from among the plurality of processing units on the basis of the execution state and the execution result of the command managed by the management unit.

According to some embodiments of the present invention, there can be provided a numerical control device having the configuration above, the device including a unit that simultaneously executes two or more commands in one piece of data in table format, the device including a plurality of processing units for determining whether a command reaches the reference value described in the data in table format and executing the commands.

BRIEF DESCRIPTION OF THE DRAWINGS

Other objects and characteristics as well as those described above of the present invention will be more apparent from the following detailed description of embodiments with reference to accompanying drawings which are:

FIG. 1 is an explanatory diagram for an example of data in table format <S1> of a spindle S;

FIG. 3 is an explanatory diagram for an example of data in table format <S2> of the spindle S;

FIG. 6 is an explanatory diagram for an example of data in table format <S3> of the spindle S;

FIG. 7 is an explanatory diagram for definitions of commands executed by processing units;

FIG. 11 is a flowchart including processes of changing the definition of the command and changing the command executed by each processing unit in addition to the flowchart in FIG. 10.

DETAILED DESCRIPTION OF THE PREFERRED EMBODIMENTS

A numerical, control device having a function of executing a plurality of commands using data in table format sets time, an axis position, or a spindle position as a reference, stores, in a memory or a storage device connected via a network thereto, data in table format in which data the time or a position of an axis or a spindle which is the reference is associated with the position of a different axis from the axis or the spindle which is the reference or the spindle or an auxiliary function, sequentially reads out the time or the position of the axis or the spindle which is the reference and the position of the different axis from the axis or the spindle which is the reference or the spindle or the auxiliary function, and controls the position of the different axis or the spindle or the auxiliary function in synchronization with the time or the position of the axis or the spindle which is the reference. The numerical, control device controls a machine tool or the like.

In order to implement the function of simultaneously executing a plurality of commands using the data in table format, the numerical control device according to one embodiment of the present invention includes: a plurality of processing units each of which performs determination as to whether the command reaches a reference value described in the data in table format and executes a command; a definition unit that defines at least one command executed by each of the plurality of processing units; and a selection unit that selects the processing unit that processes the command which is read out on the basis of the definition unit.

Figure 2:
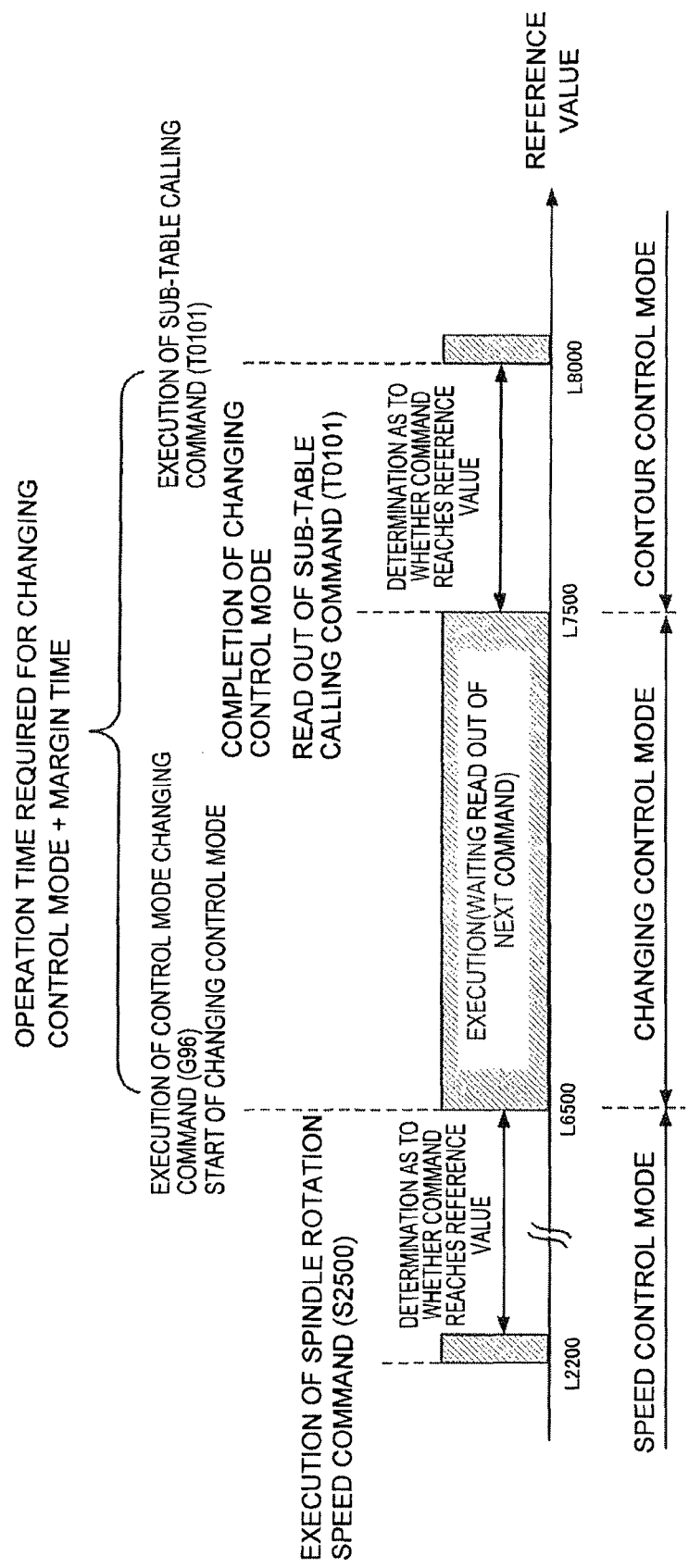
FIG. 2 is an explanatory diagram for a relation between operation time and margin time which are required for changing a control mode from a speed control mode to a contour control mode.
Figure 4:
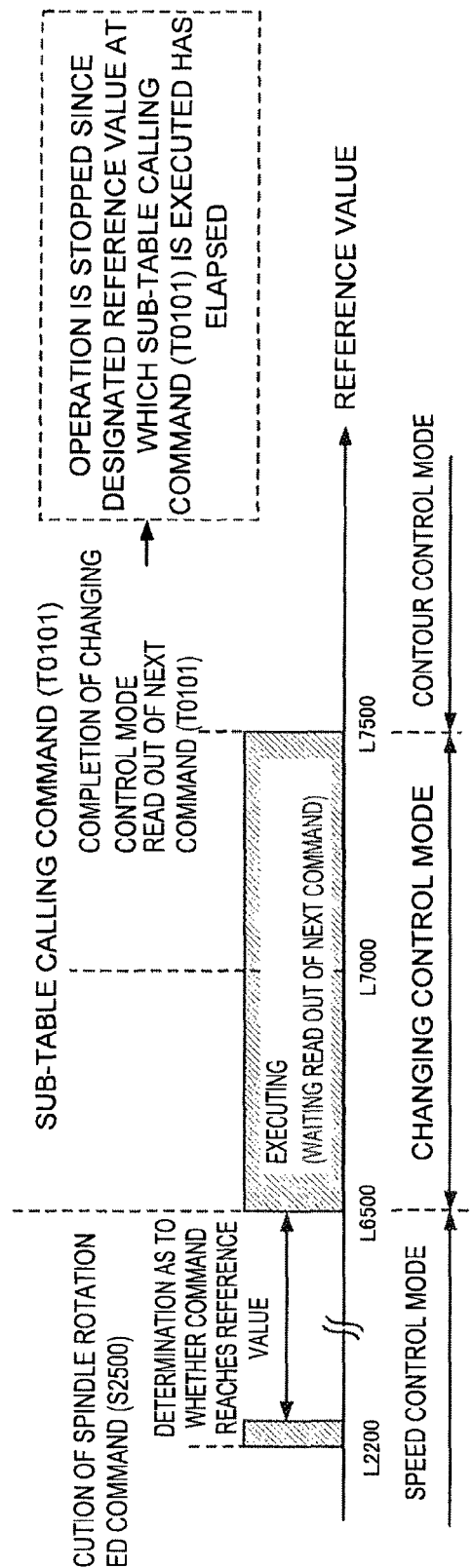
FIG. 4 is an explanatory diagram for a relation between the operation time and the margin time which are required for changing the control mode from the speed control mode to the contour control mode.
Figure 5:
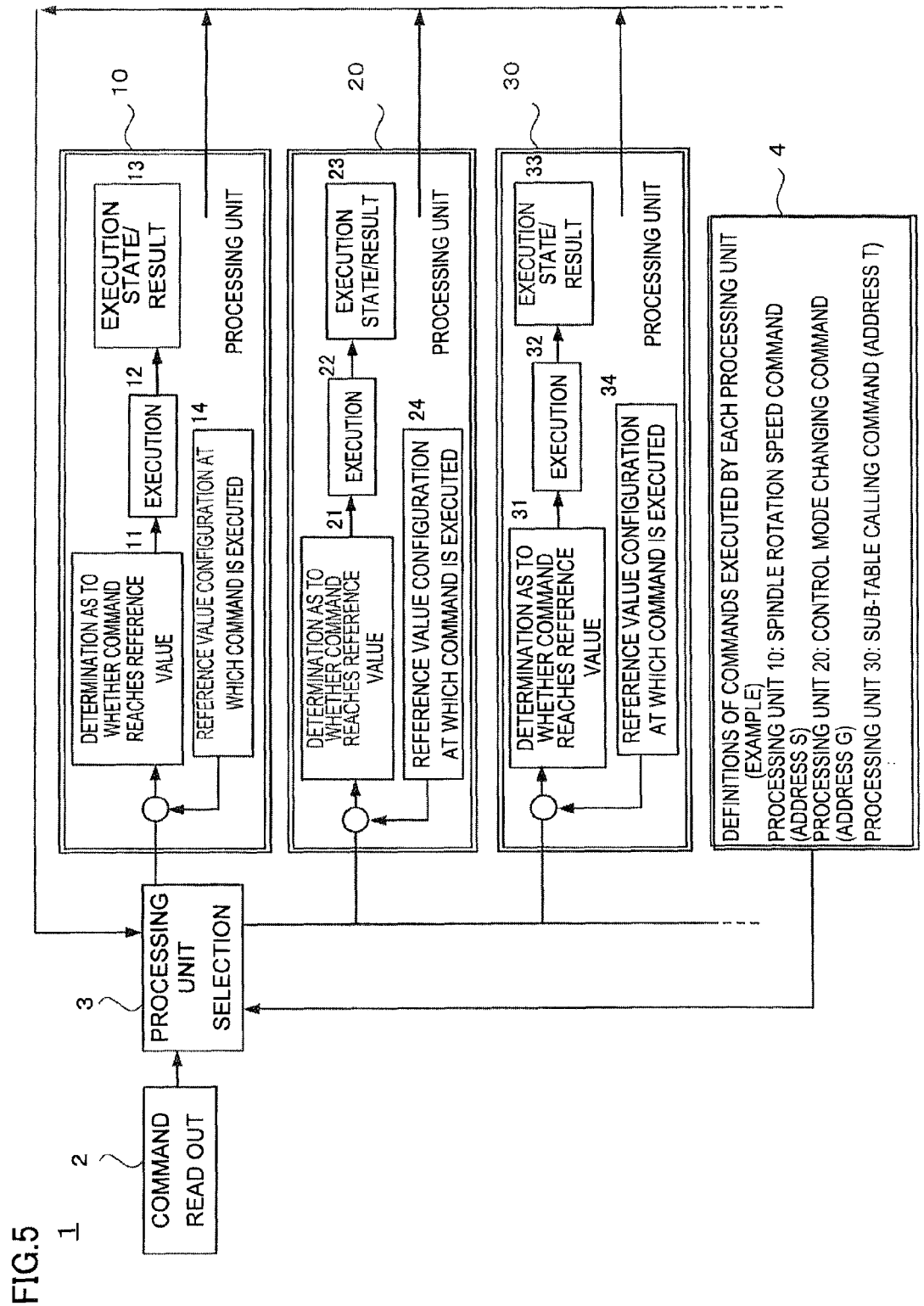
FIG. 5 is a block diagram for describing one embodiment according to the present invention.

FIG. 5 is a block diagram for explaining one embodiment of the present invention. A numerical control device 1 includes a command read out unit 2, a selection unit 3 and a definition unit 4. The numerical control device 1 further includes a plurality of processing units which are a first processing unit 10, a second processing unit 20 and a third processing unit 30. FIG. 5 illustrates three processing units but two or four or more processing units may be included.

The command read out unit 2 sequentially reads out time or a position of an axis or a spindle which is a reference and a position of a different axis from the axis or the spindle which is the reference or the spindle or an auxiliary function, these stored in a memory or a storage unit (not shown) connected via a network thereto. The selection unit 3 selects a processing unit that processes a command which is read out by the command read out unit 2 out of the plurality of processing units on the basis of a definition defined in the definition unit 4.

The definition unit 4 defines commands executed by each processing unit for the plurality of processing units included in the numerical control device 1. In the definition unit 4 illustrated in FIG. 5, a spindle rotation speed command (address S) is defined as a command executed by the first processing unit 10, a control mode changing command (address G) as a command executed by the second processing unit 20, and a sub-table calling command (address T) as a command executed by the third processing unit 30. Notably, these definitions are exemplary.

In order to define commands executed by each processing unit in the definition unit 4, a method can be adopted, for example, in which an operator of a machine configures the commands executed by each processing unit to store in the memory. Otherwise, the commands executed by each processing unit are described in data in table format, and the commands executed by each processing unit are read out from the data in table format to be stored in the definition unit 4 when the operation based on the data in table format is performed by the numerical control device 1.

Next, the individual processing units are described.

The first processing unit 10 includes reaching determination unit 11 that performs determination as to whether a command reaches a reference value described in the data in table format, an execution unit 12 that executes a command defined in the definition unit 4, a management unit 13 that holds an execution state and an execution result of the command by the execution unit 12, and reference value configuration unit 14 that configures the reference value at which the command is executed.

The second processing unit 20 includes a reaching determination unit 21 that performs determination as to whether a command reaches a reference value described in the data in table format, execution unit 22 that executes a command defined in the definition unit 4, a management unit 23 that holds an execution state and an execution result of the command by the execution unit 22, and a reference value configuration unit 24 that configures the reference value at which the command is executed.

The third processing unit 30 includes a reaching determination unit 31 that performs determination of reaching a reference value described in the data in table format, an execution unit 32 that executes a command defined in the definition unit 4, a management unit 33 that holds an execution state and an execution result of the command by the execution unit 32, and a reference value configuration unit 34 that configures the reference value at which the command is executed.

Also in the case of the plurality of processing units to be four or more, each processing unit includes a reaching determination unit that performs determination as to whether a command reaches a reference value described in the data in table format, an execution unit that executes a command defined in the definition unit 4, a management unit that holds an execution state and an execution result of the command by the execution unit, and a reference value configuration unit that configures the reference value at which the command is executed. Each processing unit is independent from the others and each processing unit can independently perform the determination as to whether a command reaches the reference value described in the data in table format and the execution of the command.

As mentioned above, the numerical control device 1 defines the commands executed by each processing unit and selects the processing unit used for each command which is read out in accordance with the definitions. The numerical control device 1 can thereby simultaneously execute two or more commands in one data in table format and independently obtain execution results thereto. Consequently, the operation time for each command is not necessary to be calculated in creating the data in table format, this allowing the creation of the data in table format to be easy. Furthermore, even for a command the operation time of which is indefinite, no addition of the maximum operation time or the margin time to a reference value of the next command is necessary to describe the reference value in the data in table format. This allows the cycle time to be reduced.

Operation of the above-mentioned numerical control device 1 is described exemplarily for changing the control mode of a spindle S on the basis of the data in table format illustrated in FIG. 6. In the data in table format <S3> of the spindle S illustrated in FIG. 6, designates an address indicating the reference value (real time; in msec units) which is described in the data in table format and at which the command is executed, S2500 designates a spindle rotation speed command for setting the rotation speed of spindle to be 2500 (rpm), G96 designates a control mode changing command from the speed control mode to the contour control mode, and T0101 designates a sub-table calling command for calling a sub-table with table number 0101.

The command executed by each processing unit is defined in the definition unit 4 as illustrated in FIG. 7. The definitions are made in the definition unit 4 such that the first processing unit 10 executes the spindle rotation speed command (address S), the second processing unit 20 executes the control mode changing command (address G), and the third processing unit 30 executes the sub-table calling command (address T).

Figure 8:
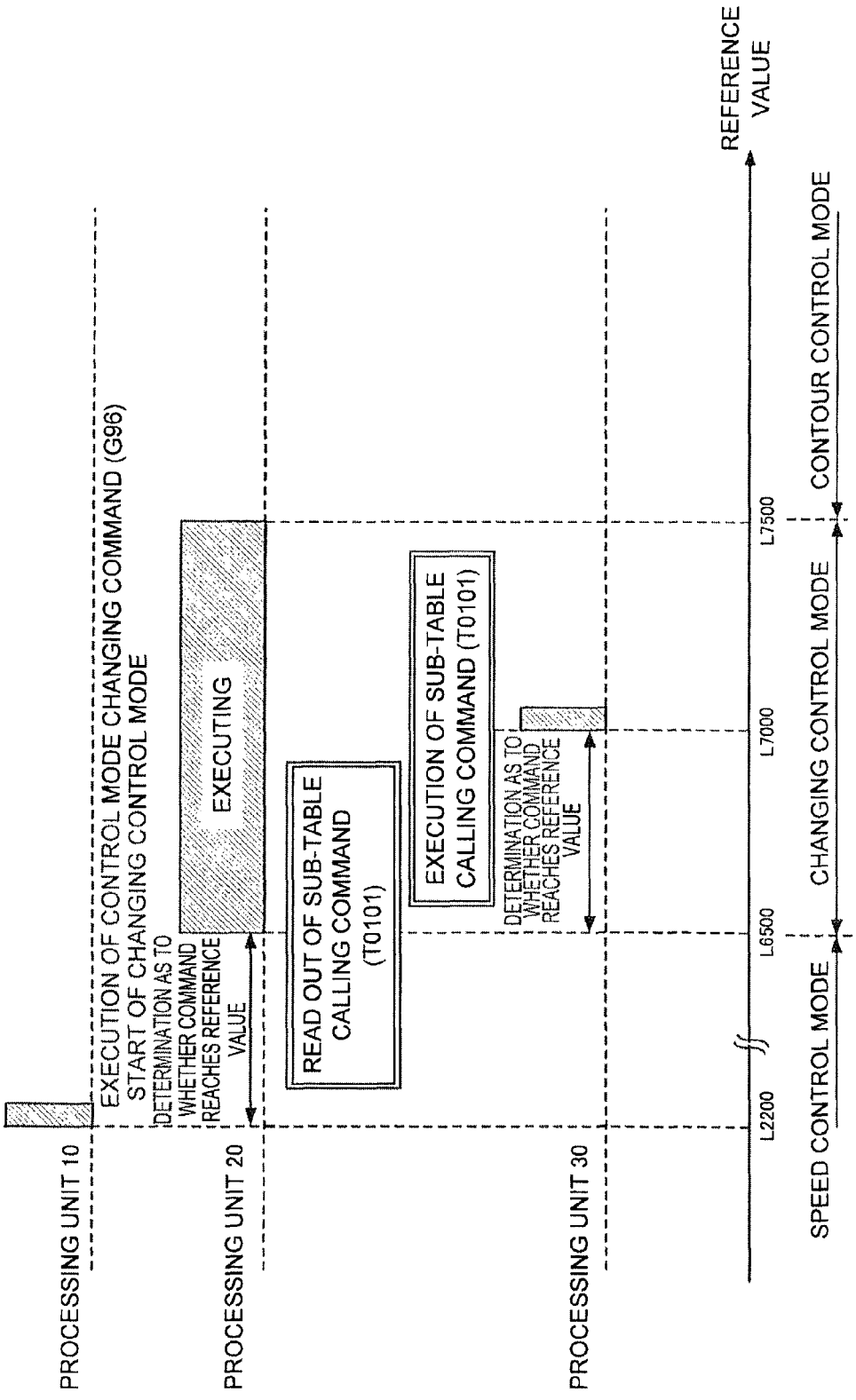
FIG. 8 is an explanatory diagram for control of changing the control mode from the speed control mode to the contour control mode in one embodiment according to the present invention.

FIG. 8 is a diagram for explaining control of changing the control mode from the speed control mode to the contour control mode according to one embodiment of the present invention. Supposing that the time required for changing the control mode is 1000 msec, although the control mode is being changed during the reference value L6500 to L7500, the sub-table calling command can be executed at the reference value L7000 according to the present invention.

Figure 9:
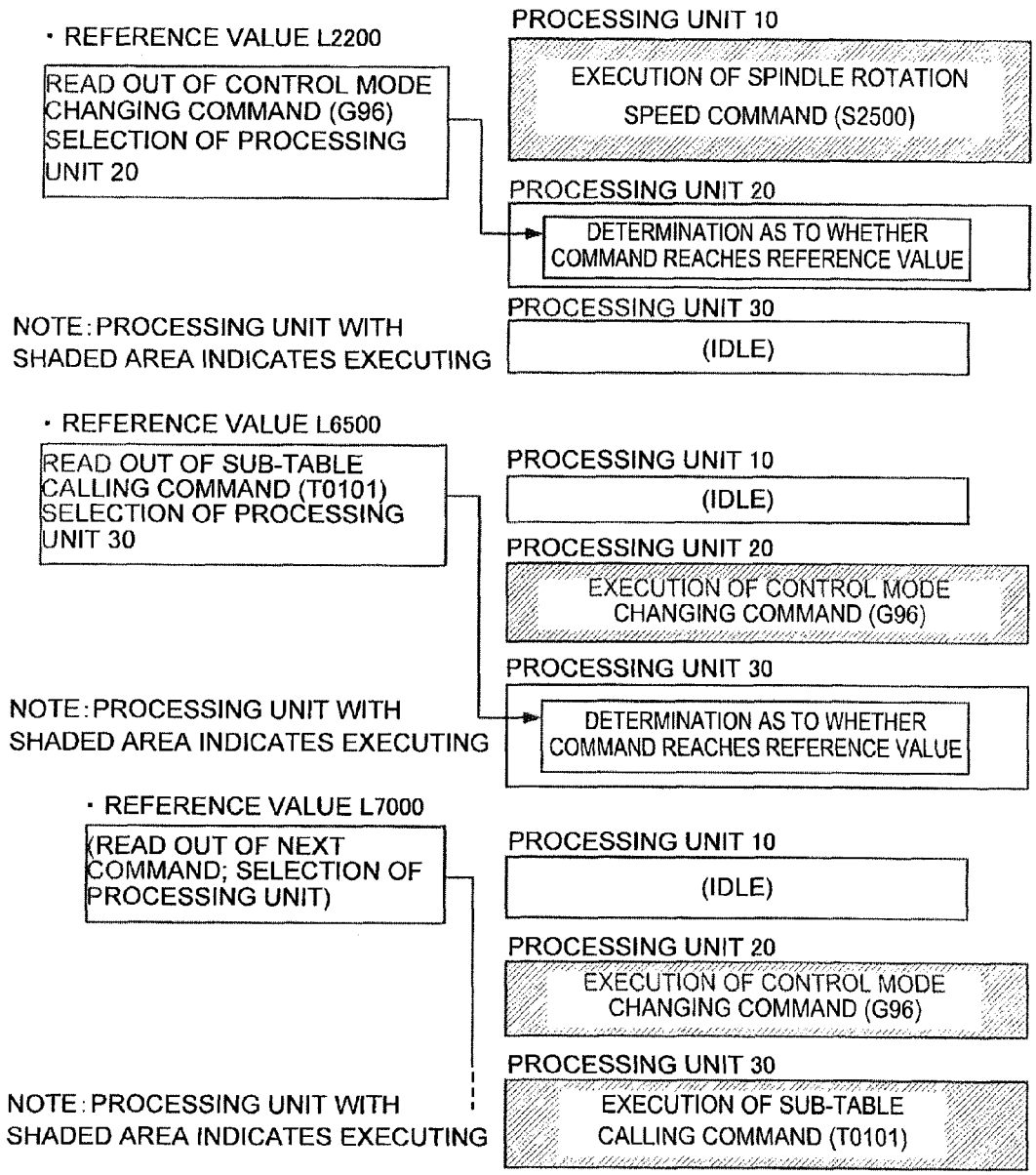
FIG. 9 is an explanatory diagram for processes executed by each processing unit in operation based on the data in table format illustrated in FIG. 8.

FIG. 9 is a diagram for explaining processes performed by each processing unit in the operation which is illustrated in FIG. 8 and is based on the data in table format. The description is made with reference to FIG. 5, FIG. 6 and FIG. 7. The numerical control device 1 sequentially performs the read out from the data in table format <S3> of the spindle S illustrated in FIG. 6 to perform the execution.

At the reference value L2200, the spindle command S read out by the command read out unit 2 is executed by the first processing unit 10 since the spindle command S is defined in the definition unit 4 as executed by the first processing unit 10. Moreover, at the reference value L2200, the command read out unit 2 reads out the control mode changing command (G96). Referring to the definition unit 4, the control mode changing command (G96) is defined as executed by the second processing unit 20. Hence, the selection unit 3 selects the second processing unit 20. Accordingly, the first processing unit 10 executes the spindle rotation speed command (S2500) and the second processing unit 20 performs determination as to whether the command reaches the reference value in order to execute the control mode changing command (G96). The third processing unit 30 processes no command at the reference value L2200, a sign (idle) represented for the state.

At the reference value L6500, the command read out unit 2 reads out the sub-table calling command (T0101) from the data in table format. The selection unit 3 refers to the definition unit 4. The sub-table calling command (T0101) is defined as executed by the third processing unit 30. Hence, the third processing unit 30 performs determination as to whether the command reaches the reference value in order to execute the sub-table calling command (T0101). The first processing unit 10 completes the processing at this stage, a sign, (idle), represented for the state.

At the reference value L7000, the command read out unit 2 reads out the next command described in the data in table format. The selection unit 3 refers to the definition unit 4. The processing unit that is defined for the next command performs determination as to whether the command reaches the reference value.

In each of the processing units 10, 20 and 30, the reference value which is described in the data in table format and at which the command which is read out is executed may be changed such that the command is executed earlier or later than at the reference value described in the data in table format. The reference value described in the data in table format may be changed to reconfigure the reference value at which the command is actually executed in each processing unit. Thereby, the proper operation interlinking with the control state of another axis, the spindle, the auxiliary function or an external control device can be performed.

The definition unit 4 can categorize the commands into one or a plurality of groups on the basis of kinds or commanding methods of the commands. Thus, the commands executed by each processing unit can be defined on the basis of the categorized groups. Such grouping of the commands allows the definitions of the commands executed by the processing units and the management of relations between the data in table format and the processing units to be easy. Moreover, the definition unit 4 may change the definitions of the commands executed by each processing unit, at the beginning of the operation based on the data in table format or during the operation. The definitions of the commands executed by the processing units are changed in accordance with the data in table format for the operation, the reference value in operation, or the control state of the external device. Thereby, the operation on the basis of the data in table format can be performed not depending on the processing units.

Each of the processing units 10, 20 and 30 includes the management unit that manages (that is, stores) the execution state and the execution result of the command in each processing unit. The selection unit 3 provides a unit that selects the processing unit in accordance with the execution state and the execution result of the command which are reported from each processing unit in the selection unit 3, using the execution state and the execution result of the command which are managed by the management unit of each of the processing units 10, 20 and 30. When the execution of the command is disturbed in a specific processing unit, the most suitable processing unit is selected in the processing of selecting the processing unit. Thereby, a smooth operation can be performed.

Figure 10:
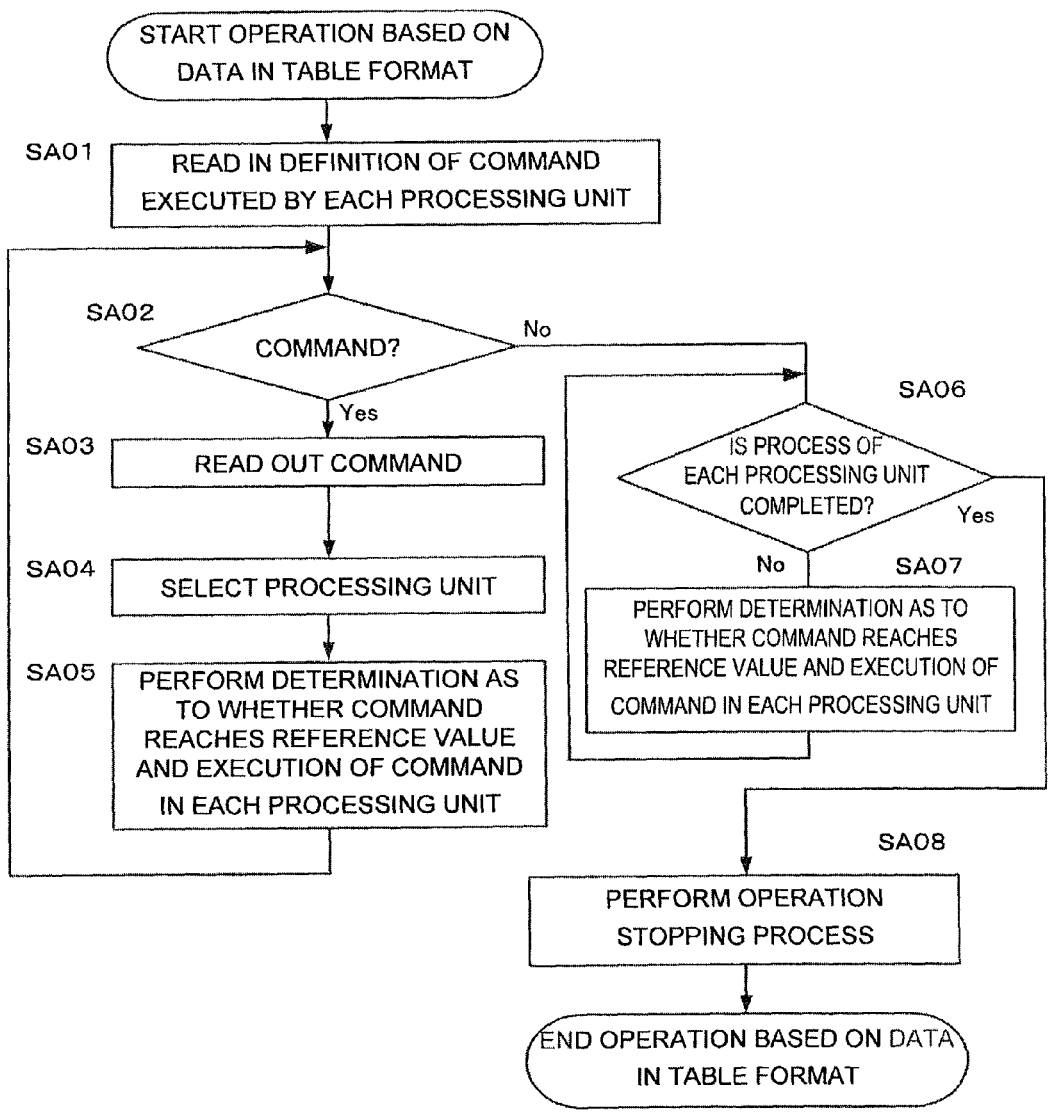
FIG. 10 is a flowchart for describing processes according to one embodiment of the present invention.

FIG. 10 is a flowchart for explaining processes according to the embodiment. The processes illustrated in FIG. 10 correspond to claim 1. Hereafter, the description is made in accordance with the individual steps.

[Step SA01] The definition of the command executed by each processing unit is read in from the definition unit.

[Step SA02] Whether or not there is a command in the data in table format is determined. In the case of affirmative (YES), the process is put forward to step SA03, and in the case of negative (NO), the process is put forward to step SA06.

[Step SA03] One command is read out of the data in table format.

[Step SA04] The processing unit that executes the one command read out in step SA03 is selected on the basis of the definition in the definition unit.

[Step SA05] Each processing unit selected in step SA04 performs the determination as to whether the command reaches the reference value and the execution of the command. The process is returned to step SA02.

[Step SA06] Whether or not the process of each processing unit is completed is determined. In the case of completion (YES), the process is put forward to step SA08, and in the case of no completion (NO), the process is put forward to step SA07.

[Step SA07] Each processing unit performs the determination as to whether the command reaches the reference value and the execution of the command. The process is returned to step SA06.

[Step SA08] The process of stopping the operation based on the data in table format is performed.

FIG. 11 is a flowchart including processes of changing the definition of the command and changing the command executed by each processing unit in addition to the flowchart in FIG. 10.

[Step SB01] The definition of the command executed by each processing unit is read in from the definition unit.

[Step SB02] Whether or not there is a command in the data in table format is determined. In the case of affirmative (YES), the process is put forward to step SB03, and in the case of negative (NO), the process is put forward to step SB08.

[Step SB03] One command is read out of the data in table format.

[Step SB04] Whether or not there is a command of changing the command defined in the definition unit is determined. In the case where there is a command of changing (YES), the process is put forward to step SB05, and in the case where there is no command of changing (NO), the process is put forward to step SB06.

[Step SB05] The command executed by each processing unit is defined.

[Step SB06] The processing unit that executes the one command read out in step SB03 is selected on the basis of the definition in the definition unit.

[Step SB07] Each processing unit selected in step SB06 performs the determination as to whether the command reaches the reference value and the execution of the command. The process is returned to step SB02.

[Step SB08] Whether or not the process of each processing unit is completed is determined. In the case of completion (YES), the process is put forward to step SB10, and in the case of no completion (NO), the process is put forward to step SB09.

[Step SB09] Each processing unit performs the determination as to whether the command reaches the reference value and the execution of the command. The process is returned to step SB08.

[Step SB10] The process of stopping the operation based on the data in table format is performed.

What is claimed is:

1. A numerical control device for operation based on data in table format, configured to:
set time or a position of an axis or a spindle as a reference,
store, in a memory or a storage device connected via a network thereto, the data in table format in which the time or the position of the axis or the spindle as the reference is associated with a position of a different axis or spindle from the axis or the spindle as the reference or an auxiliary function,
and the device includes a command read out unit configured to sequentially read out the time or the position of the axis or the spindle as the reference and the position of the different axis or spindle from the axis or the spindle as the reference or the auxiliary function,
and the device is further configured to control the position of the different axis or spindle or the auxiliary function in synchronization with the time or the position of the axis or the spindle as the reference, the device comprising:
a plurality of processing units each of which configured to determine whether a command reaches a reference value described in the data in table format and execute the command;
a definition unit configured to define at least one command to be executed by each of the plurality of processing units; and
a selection unit configured to select one processing unit configured to process the command which is read out on the basis of the definition unit.

2. The numerical control device for operation based on data in table format according to claim 1, wherein
each of the plurality of processing units includes a changing unit configured to change the reference value described in the data in table format for executing the read-out command.

3. The numerical control device for operation based on data in table format according to claim 1, the definition unit is further configured to categorize a plurality of commands into one or a plurality of groups and define the command executed by each processing unit on the basis of the groups.

4. The numerical control device for operation based on data in table format according to claim 1, the definition unit includes a changing unit configured to change a definition of the command executed by each processing unit at beginning of the operation or in the operation based on the data in table format.

5. The numerical control device having operation based on data in table format according to claim 1, wherein
each of the plurality of processing units includes a management unit configured to manage an execution state and an execution result of the command in the processing unit.

6. The numerical control device having operation based on data in table format according to claim 5, wherein
the selection unit is configured to select one processing unit from among the plurality of processing units, on the basis of the execution state and the execution result of the command managed by the management unit.

7. The numerical control device for operation based on data in table format according to claim 2, the definition unit is further configured to categorize a plurality of commands into one or a plurality of groups and define the command executed by each processing unit on the basis of the groups.

8. The numerical control device for operation based on data in table format according to claim 2, the definition unit includes a changing unit configured to change a definition of the command executed by each processing unit at beginning of the operation or in the operation based on the data in table format.

9. The numerical control device for operation based on data in table format according to claim 3, the definition unit includes a changing unit configured to change a definition of the command executed by each processing unit at beginning of the operation or in the operation based on the data in table format.

10. The numerical control device having operation based on data in table format according to claim 2, wherein
each of the plurality of processing units includes a management unit configured to manage an execution state and an execution result of the command in the processing unit.

11. The numerical control device having operation based on data in table format according to claim 3, wherein
each of the plurality of processing units includes a management unit configured to manage an execution state and an execution result of the command in the processing unit.

12. The numerical control device having operation based on data in table format according to claim 4, wherein
each of the plurality of processing units includes a management unit configured to manage an execution state and an execution result of the command in the processing unit.

13. The numerical control device having operation based on data in table format according to claim 10, wherein
the selection unit is configured to select one processing unit from among the plurality of processing units, on the basis of the execution state and the execution result of the command managed by the management unit.

14. The numerical control device having operation based on data in table format according to claim 11 wherein the selection unit is configured to select one processing unit from among the plurality of processing units, on the basis of the execution state and the execution result of the command managed by the management unit.

15. The numerical control device having operation based on data in table format according to claim 12, wherein the selection unit is configured to select one processing unit from among the plurality of processing units, on the basis of the execution state and the execution result of the command managed by the management unit.

* * * * *